Dec. 3, 1957     LA VERN A. CAMPBELL     2,815,243
WINDOW AND DOOR CONSTRUCTION FOR DETACHABLE CAB
Filed Jan. 4, 1956
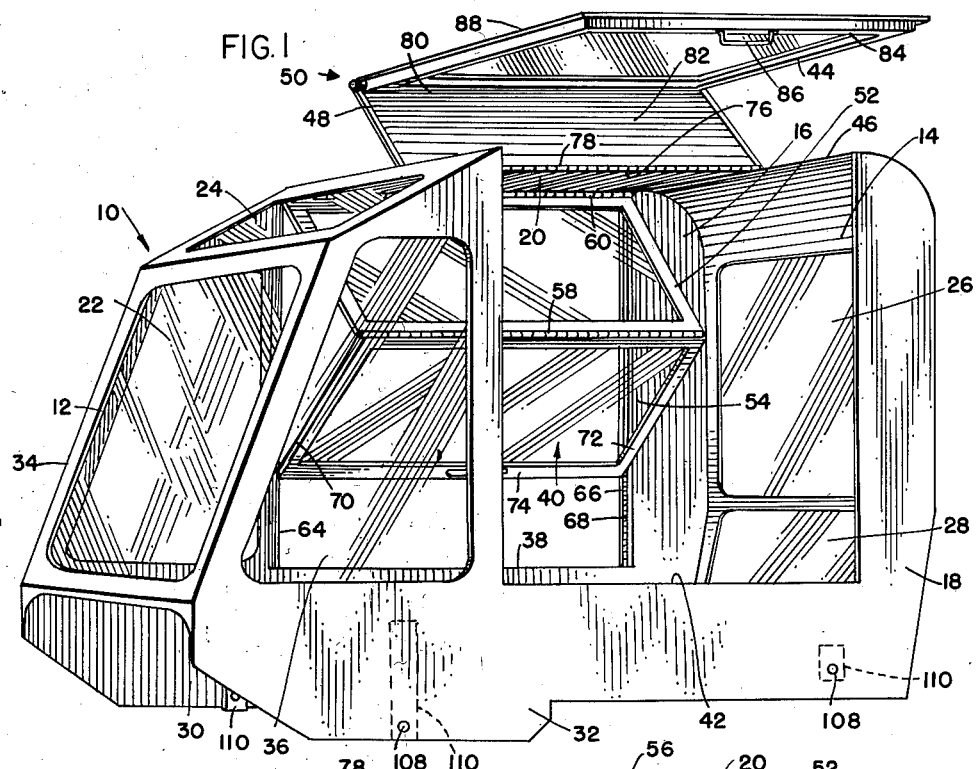
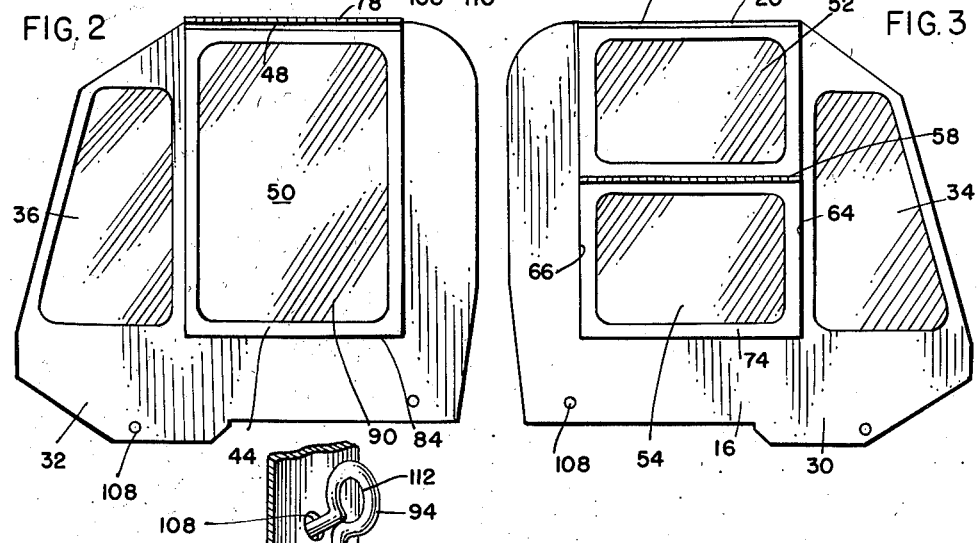
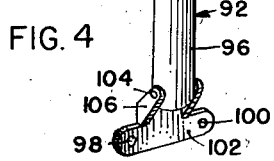
INVENTOR:
LA VERN A. CAMPBELL
BY
ATT'YS

United States Patent Office 2,815,243
Patented Dec. 3, 1957

2,815,243

WINDOW AND DOOR CONSTRUCTION FOR DETACHABLE CAB

LaVern A. Campbell, Wauconda, Ill.

Application January 4, 1956, Serial No. 557,339

5 Claims. (Cl. 296—28)

This invention relates to detachable cabs for use on tractors or other heavy duty equipment, and more particularly to an improved detachable cab having vertically foldable doors and window closures.

In currently available cabs having adjustable door and window closures, considerable effort is required to place the closures in open or ventilating position, and when in such position, they require heavy storage compartments or otherwise take up needed cab space and interfere with efficient operation of the vehicle.

It is accordingly an object of the present invention to provide an improved detachable cab having vertically foldable door and window closures which can be stored, when opened, in stacked relation with the roof of the cab, so that the operator will have complete freedom of movement within the cab.

Anoher object is to provide a detachable cab of the type indicated wherein the door and window closures can be pivoted upwardly into folded and stacked relation with the roof by the simple expedient of grasping the lower edge of the closure, or a handle affixed thereto, and applying a relatively slight amount of upward force, the opening being accomplished in a single movement.

Another object is to provide a detachable cab of the type indicated, which can be easily lifted into position on the machine or removed therefrom, with only one man required on each side of the cab, for example, the lightness of weight of the cab being due in part to the fact that no storage compartments or other heavy structure for the door and window closures is required.

Another object is to provide a detachable cab of the type indicated, in which the window is hingedly secured to the roof and is provided with a hinge intermediate its top and bottom edges so that the two window panels thus formed may be folded inwardly of the cab into flat underlying relationship with the roof.

Another object is to provide a window of the type described in which guide means are provided for the lower panel, comprising a track or guideway in each of the vertical edges of the window opening and pins or slide elements on the bottom vertical edges of the lower window panel, so that the window will be folded automatically into stacked relation with the roof when the lower edge thereof is grasped and raised.

Another object of the invention is to provide a cab of the type indicated having a door closure which is formed in two sections, one section being a panel forming a part of the roof and hingedly secured thereto, and the other section being hingedly secured to the outer edge of the first and adapted to seat snugly in a door opening in the cab or pivot upwardly into flat overlying relation with the first section or panel and the roof when lifted manually.

Another object is to provide a hinged construction for the door and window of the cab, which will permit these closures to be disposed in substantially parallel relation with the roof when in their folded or open position.

Another object is to provide a cab of the type indicated which is strong and economical and which combines a weatherproof construction with a maximum of visibility and ventilation.

Other objects and advantages will become apparent as the description proceeds in accordance with the drawings, in which:

Figure 1 is a perspective view of a detachable cab, according to the invention, with the door and window thereof partially opened;

Fig. 2 is a side elevational view of the cab and the door for the cab, the door being in closed position;

Fig. 3 is a side elevational view of the cab and the window according to the invention; and Fig. 4 is a perspective view, partly broken away, of a clamp adapted to releasably secure the cab to the vehicle.

Referring now to Fig. 1, the cab 10 is constructed of a suitably rigid, light weight material such as plastic or plywood, and comprises a front wall 12, a rear wall 14, side walls 16 and 18 and a roof 20. The front wall 12 has a downwardly inclined windshield 22 which affords a view of the job and an upper window 24 offset inwardly from the windshield 22 at an angle approaching the horizontal so that a sufficient amount of light will enter the cab. The rear wall 14 is also provided with two windows 26 and 28, for good rearward vision for the operator, the upper window 26 being preferably vertical and the lower window 28 being somewhat inclined inwardly. The side walls 16 and 18 have extensions 30 and 32 depending therefrom, while the lower margins of the walls 12 and 14 are also contoured to seat snugly on the body frame of a tractor or similar machine. The side walls 16 and 18 have substantially triangular fixed forward windows 34 and 36 respectively, and the wall 16 has a window opening 38 for a vertically foldable window 40, while the wall 18 has a door opening 42 for a door 44 which is continuous with a rectangular opening 46 in the roof 20 for a panel section 48, the door 44 and panel section 48 together comprising a vertically foldable door closure 50 as will be hereinafter further described.

The window 40 has an upper window panel 52 and a lower window panel 54 of identical widths, secured together and to the outer edge 56 of the roof by means of piano hinges 58 and 60 which are preferably secured to the under side of the roof and to the inner side of the window panels as shown so that the window panels can be folded into contiguous underlying relationship with the roof 20.

The vertical edges 64 and 66 of the window opening 38 are each grooved or otherwise suitably arranged to provide tracks or guideways 68, and suitable pins or slide means (not shown) are formed on the lower side edges 70 and 72 of the panel 54 for slidably securing the bottom edge of the panel 54 to the vertical edges of the window opening, so that when it is desired to raise the window 40 into stacked underlying relation with the roof 20, the lower rail 74 of the window may be grasped and raised, with only slight effort, along the plane defined by edges 66 and 68. In this manner the panels 52 and 54 will automatically fold together. These panels are preferably of identical dimensions so that the very minimum of space will be used when they are stored in underlying relation with the roof, and suitable latch means (not shown) may be provided to engage the hinged panel joint and maintain them in this position.

Referring now to Figs. 1 and 2, the upper door panel 48 is hingedly secured to the inner edge 76 of roof 20 by means of a piano hinge 78 which is preferably affixed to the outer surfaces of the roof and panel respectively so that the panel may pivot easily into overlying relation with the roof. The top edge of the door 44 is hingedly connected to the outer edge of the panel 48 by means of a piano type hinge 80 which is preferably secured to inner surfaces of the panel and door respectively, so that the door can rest in supported relationship upon the entire inner surface 82 of the panel 48 when the panel is folded into contiguous overlapping relationship with the roof 20. The panel 48 extends for preferably 40% to 60% of the entire width of the roof, and accordingly, when the door is in stacked relationship therewith, the underlying support surface provided will be sufficient to position the door securely against excessive jarring or vibration.

When it is desired to raise the door from the closed position shown in Fig. 2 into the open position just described, the lower edge 84 of the door is grasped by a suitable handle 86 and the door is lifted upwardly. As it is lifted, the entire door closure 50 will pivot around the hinge 78 and the door and panel will fold together, so that the actual amount of lifting force required is very small.

The door is provided with a peripheral flange 88 which engages the wall 18 when the door is swung downwardly into closed position, and has a window 90 which is preferably formed of safety glass as are the other windows referred. The frame of the window opening 38 may also have a peripheral flange projecting laterally into the opening and corresponding to flange 88, so that the cab will be thoroughly weatherproof when the window is closed.

Referring now to Fig. 4, a plurality of clamps 92 are provided which are adapted to releasably secure the cab 10 to a tractor or similar machine. A hook 94 is slidably mounted in a tube 96 of the clamp and is biased downwardly by suitable spring means (not shown) within the tube. The clamp can be permanently bolted to the machine by means of bolts (not shown) inserted in apertures 98 and 100 of bracket 102, which is pivotally secured to the lower end of the tube 96 by means of trunnion pins 104 in ears 106 on either side of the tube, and the cab body 10 is provided with apertures 108 adapted to receive hooks 94. A plurality of lugs or metal reinforcing elements 110 are secured to the inner walls of the cab with suitable apertures in register with the apertures 108 in the cab body, and when the hook 94 is lifted into position by means of a rounded grip 112 in the hook, the hook may be readily pivoted into the apertures to hold the cab body firmly on the machine. It will be understood however, that the clamp described constitutes only one suitable method of securing the cab to the machine, and in some instances it may be useful to fasten the cab permanently.

There has thus been provided a cab for tractors and the like which makes feasible the continuation of work in all types of whether while affording an unusual amount of ventilation when desired. The simplicity and strength of the construction permits easy manipulation without damage and permits substantial economies in manufacture; while the light weight of the cab which results from the elimination of extra working parts permits the cab to be lifted easily onto and off of the machine. Because of the fact that the vertically foldable closures occupy almost no cab space in their stacked position, the operator is assured of maximum freedom of movement at all times while being enabled to easily enter and leave the cab. And even when the door is in open position, the operator is protected from light rain, since the door extends across the opening in the roof, which is normally closed by the panel 48.

Although the invention has been set forth and described with reference to particular details and principles, it will be understood that modifications of detail and rearrangement of parts may be effected without departing from the spirit and scope of the invention as set forth in the following claims.

I claim:

1. A detachable cab for tractors and the like comprising a substantially rigid body having a front wall, a rear wall, side walls and a roof, one of said side walls having a rectangular window opening, and a closure for said opening formed with two window panels pivotally connected on a horizontal axis intermediate the upper and lower edges of said closure, the upper window panel being pivotally connected to said roof, and the pivot connection between said panels being adapted for 180° swing of one relative to the other, whereby said window may be folded vertically and inwardly into face to face relation and in parallel underlying relation with said roof.

2. A detachable cab for tractors and the like comprising a substantially rigid body having a front wall, a rear wall, side walls and a roof having a rectangular cut-out portion opening to one side of the roof edge, said cab body having a door opening continuous with the cut-out portion of said roof, and a door closure comprising a panel pivotally secured to the roof at the inner edge of said cut-out portion and a door pivotally secured to the outer edge of said panel, said pivot connection of said panel and roof being adapted for 180° swing of said panel relative to said roof, whereby said panel and door may be folded vertically into flat face to face overlying relation with each other and said roof.

3. A detachable cap for tractors and the like comprising a substantially rigid body having a front wall, a rear wall, side walls and a roof having a rectangular cut-out portion, said cab body having a side wall door opening continuous with the cut-out portion of said roof and an opposite side wall window opening of rectangular form, a door closure comprising a top panel hingedly secured to said roof at the inner edge of said cut-out portion for 180° swinging movement about the hinge axis and a door panel hingedly secured to the outer edge of said top panel, and a rectangular window opening closure formed with two window panels hingedly connected on a horizontal axis intermediate the upper and lower edges of said window, the upper window panel being pivotally connected to said roof for swinging inwardly and upwardly with respect thereto, said window closure and said door closure being each vertically foldable into flat face to face vertically stacked relation with said roof.

4. A detachable cab for tractors and the like comprising a substantially rigid body having a front wall, a rear wall, side walls and a roof and a rectangular window opening in one of said walls, and a closure for said opening formed with two window panels pivotally connected intermediate the upper and lower edges of said closure, the upper window panels being pivotally connected to said roof, whereby said closure may be folded vertically and inwardly into underlying relation with said roof, said pivotal connection between said roof and said upper window panel comprising a piano hinge secured to the inner surfaces of said roof and said upper panel respectively, and said pivotal connection between said upper window panel and said lower window panel comprising a piano hinge secured to the outer surfaces of said upper and lower panels respectively.

5. A detachable cab for tractors and the like comprising a substantially rigid body having a front wall, a rear wall, side walls and a roof having a rectangular cut-out portion, said cab body having a door opening in one of said walls continuous with the cut-out portion of said roof, and a door opening closure comprising a first panel pivotally secured to the inner edge of said cut-out portion and a second panel pivotally secured to the outer edge of said first panel, whereby said door opening closure may be folded vertically into overlying relation with said roof, said pivotal connection between said first panel and said roof comprising a piano hinge secured to the outer surfaces of said roof and panel, and said pivotal connection between said first panel and said second panel comprising a piano hinge secured to the inner surfaces of said panel and said door respectively.

References Cited in the file of this patent

UNITED STATES PATENTS

| | | |
|---|---|---|
| 1,092,501 | Miller | Apr. 7, 1914 |
| 1,451,626 | Morrison | Apr. 10, 1923 |
| 1,523,704 | Morine | Jan. 20, 1925 |
| 2,581,797 | Jordan | Jan. 8, 1952 |

FOREIGN PATENTS

| | | |
|---|---|---|
| 844,544 | Germany | July 21, 1952 |